(12) United States Patent
Logvinov et al.

(10) Patent No.: US 10,654,364 B2
(45) Date of Patent: May 19, 2020

(54) METHOD AND APPARATUS FOR A WIRELESS CHARGING SYSTEM

(71) Applicant: STMicroelectronics, Inc., Coppell, TX (US)

(72) Inventors: Oleg Logvinov, East Burnswik, NJ (US); Bo Zhang, Edison, NJ (US); James D. Allen, LaGrange, KY (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 16/198,118

(22) Filed: Nov. 21, 2018

(65) Prior Publication Data

US 2019/0106010 A1 Apr. 11, 2019

Related U.S. Application Data

(63) Continuation of application No. 14/839,447, filed on Aug. 28, 2015, now Pat. No. 10,137,794.
(Continued)

(51) Int. Cl.
*B60L 53/12* (2019.01)
*B60L 11/18* (2006.01)
(Continued)

(52) U.S. Cl.
CPC .......... *B60L 11/1829* (2013.01); *B60L 53/12* (2019.02); *B60L 53/20* (2019.02); *B60L 53/38* (2019.02); *B60L 53/63* (2019.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/16* (2013.01)

(58) Field of Classification Search
USPC ....................................................... 320/108
See application file for complete search history.

(56) References Cited

U.S. PATENT DOCUMENTS 8,338,991 B2 12/2012 Von Novak
2012/0112697 A1 5/2012 Heuer et al.
(Continued)

FOREIGN PATENT DOCUMENTS

CN 102574476 A 7/2012
CN 103891099 A 6/2014
(Continued)

OTHER PUBLICATIONS

Qualcomm, "HomePlug Green PHY," http://blog.sina.com.cn/qualcommchina, Apr. 22, 2018, 4 pages.

*Primary Examiner* — Mohammed Alam
(74) *Attorney, Agent, or Firm* — Slater Matsil, LLP

(57) ABSTRACT

An embodiment is a system including a first wireless charging pad coupled to a wireless charging system and an energy source, the first wireless charging pad being configured to transmit an energy by a magnetic field. The system further includes a second wireless charging pad coupled to a second system, the second wireless charging pad configured to receive at least a portion of the energy from the first wireless charging system for operating the second system. Further embodiments include a least one of an electronic compass configured to provide alignment data of the first and second wireless charging pads, and an interface configured to receive the alignment data and affect an alignment of the first and second wireless charging pads.

20 Claims, 12 Drawing Sheets

Related U.S. Application Data

(60) Provisional application No. 62/050,651, filed on Sep. 15, 2014, provisional application No. 62/116,859, filed on Feb. 16, 2015.

(51) Int. Cl.
  *B60L 53/20* (2019.01)
  *B60L 53/63* (2019.01)
  *B60L 53/38* (2019.01)

(56) References Cited

U.S. PATENT DOCUMENTS

| | | | |
|---|---|---|---|
| 2012/0146576 A1* | 6/2012 | Partovi | H01F 7/0252 |
| | | | 320/108 |
| 2013/0029595 A1 | 1/2013 | Widmer | |
| 2014/0111022 A1 | 4/2014 | Yamakawa | |
| 2014/0132207 A1 | 5/2014 | Fisher | |
| 2014/0132210 A1* | 5/2014 | Partovi | H02J 5/005 |
| | | | 320/108 |
| 2014/0285030 A1* | 9/2014 | Nakamura | H02J 5/005 |
| | | | 307/104 |
| 2014/0285139 A1* | 9/2014 | Ahn | B60L 11/182 |
| | | | 320/108 |
| 2016/0075245 A1* | 3/2016 | Logvinov | B60L 11/1829 |
| | | | 320/108 |
| 2016/0311337 A1* | 10/2016 | Ichikawa | H02J 5/005 |

FOREIGN PATENT DOCUMENTS

| | | |
|---|---|---|
| WO | 2013061440 A1 | 5/2013 |
| WO | 2014077896 A1 | 5/2014 |

* cited by examiner

METHOD AND APPARATUS FOR A WIRELESS CHARGING SYSTEM

This application is a continuation of U.S. patent application Ser. No. 14/839,447, filed on Aug. 28, 2015, entitled "Method and Apparatus for a Wireless Charging System," which claims the benefit of U.S. Provisional Application No. 62/050,651, filed on Sep. 15, 2014, entitled "Communications in a Wireless Charging System" and U.S. Provisional Application No. 62/116,859, filed on Feb. 16, 2015, entitled "Method and Apparatus for a Wireless Charging System," which patent applications are incorporated herein by reference.

TECHNICAL FIELD

This invention relates generally to a wireless charging system, and more particularly to a method and apparatus used for wireless communication between the wireless charging system and the device(s) it charges and for aligning charging pads of the wireless charging system and for associating and validating the relationship between the charging pads.

BACKGROUND

Transportable systems that include propulsion systems powered by electricity, such as electric vehicles (EVs), have become more widespread. The batteries or energy storage for EVs are typically charged through some type of wired alternating current (AC) or direct current (DC) such as household or commercial energy sources. These wired charging systems may be inconvenient and/or require a considerable amount of human intervention to utilize. Wireless charging systems for electric vehicles that are capable of transferring power across free space to may overcome some of the deficiencies of wired charging solutions.

BRIEF DESCRIPTION OF THE DRAWINGS

For a more complete understanding of the present invention, and the advantages thereof, reference is now made to the following descriptions taken in conjunction with the accompanying drawings, in which.

Figure 1A:
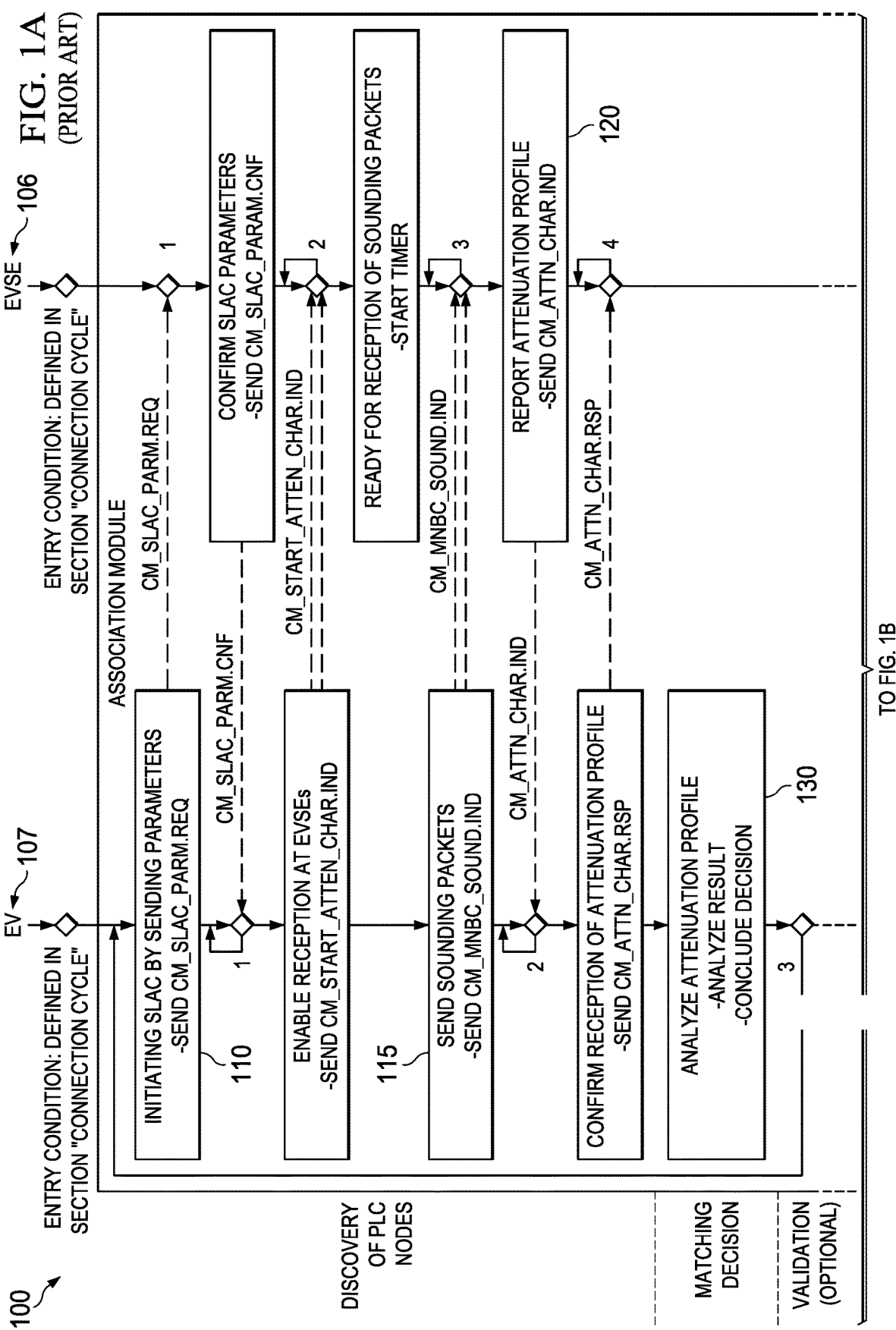
FIGS. 1A-B illustrate a prior art wired charging process flow diagram including SLAC and validation processes, per HomePlug Green PHY v1.1 and ISO/IEC 15118-3.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. For example, this disclosure may be applied, but not limited to, the automotive industry as well as consumer electronic devices such as mobile phones. The specific embodiments discussed are merely illustrative of specific ways to make and use the disclosed subject matter, and do not limit the scope of the different embodiments.

Embodiments will be described with respect to embodiments in a specific context, namely a wireless charging system and a method of operating wireless charging system. Some of the various embodiments described herein include a method and apparatus for aligning, associating, and/or validating charging pads in a wireless charging system. In some embodiments, the wireless charging system may be used to charge/power an electric vehicle (EV), such as an automobile, boat, motorcycle, space-based vehicle, or the like. In other embodiments, aspects may also be applied to other applications involving any type of wireless charging system according to any fashion known in the art, such as medical devices and systems, consumer electronics, etc.

In general terms, embodiments of the present disclosure include a wireless charging system that utilizes PLC communication over the same charging pads used for charging the device to be charged. In particular, the PLC communication is transmitted by an electromagnetic field between an energized charging pad on the wireless charger and a receiver charging pad on the device to be charged. The PLC communication is utilized to transfer information between the device being charged and the wireless charger during the charging process. This information may include charging status, billing information, and many other messages that need to be exchanged for proper operation and useful applications. In addition, the PLC communication link between the charging pads may also be used to align the charging pads. For example, the PLC communication link may utilize an orthogonal frequency-division multiplexing (OFDM) method of encoding data, and the charging pads may be aligned based, at least in part, on a channel estimation of the OFDM communication link. In some embodiments, the alignment is based, at least in part, on the signal-to-noise ratio of the PLC communication. Because the PLC communication is applied to the entire energized charging pad (which may be comprised of an array of smaller charging pads and/or coils), the channel estimation and/or signal-to-noise ratio of the PLC communication provides an alignment measure based on the entire charging pad without the need for specific alignment structures in the charging pads. This technique allows for fine tuning the alignment of the charging pads without extra alignment structures on or adjacent the charging pads.

Further, embodiments of the present disclosure include a wireless charging system that is configured to optimize the magnetic field alignment of the charging pads in order to achieve maximum energy transfer between the charging pads while also ensuring proper association and validation. In particular, the wireless charging system utilizes an electronic compass to provide wireless charging pad alignment, association, and/or validation information. The electronic compass may be a 1-D (1-dimensional), 2-D, 3-D, 6-D, or 9-D (1, 2, 3, 6, or 9 axes of compass information) electronic compass. The electronic compass may utilize a magnetometer, an accelerometer, a gyroscope, power line communication (PLC) signal properties, fixed magnets, electromagnets, or a combination thereof. A 1-D, 2-D, or 3-D electronic compass may utilize any one of a magnetometer, a gyroscope, an accelerometer, or the like. A 6-D electronic compass may utilize any two of a magnetometer, a gyroscope, an accelerometer, or the like. A 9-D electronic compass may utilize any three of a magnetometer, a gyroscope, an accelerometer, or the like. In an embodiment where the electronic compass includes a magnetometer, the magnetometer is used to sense the energized charging pad's magnetic field and to find the optimum location of the receiving charging pad to allow it to receive maximum energy transfer from the energized charging pad. Moreover, the wireless charging system can use the electronic compass data or the Signal Level Attenuation Characterization (SLAC) protocol specified in HomePlug Green PHY v1.1 specification to further enhance the association and validation processes. The wireless charging pad alignment information may be provided to an interface that provides the data used to control the movement of the charging pads enabling the charging pads to be aligned. For example, the interface may be connected to a processing device capable of providing information to a graphical display, a textual display, an audio interface, the like, or a combination thereof. In addition, the interface may be connected to a control system that automatically (without human intervention) aligns the wireless charging pads.

Before addressing illustrative embodiments of the present disclosure in detail, a brief discussion of a wired charging embodiment is discuss to help provide context to the later described embodiments.

EV systems will be used as the example but the solutions and applications are not limited to EVs. Plug-in Electric vehicles (PEV) contain batteries including those that energize motors that drive the wheels, commonly referred to as "traction batteries". The batteries are charged through a cable connected to a charging station commonly referred to as Electric Vehicle Supply Equipment (EVSE) which includes a Supply Equipment Charge Controller (SECC). The EVSE's power cord is plugged into the PEV's power and communications receptacle, commonly referred to as an inlet. The cable's PEV-plug is commonly referred to as a "coupler" but it should not to be confused with an electronic coupler used to interface a power line communication (PLC) modem to a metallic wiring (i.e., a power line). Generally, the term "EV" indicates any vehicle that uses electrical energy for propulsion (in its "drive chain"). The "PEV" is one of several types of EV and generally denotes an EV whose batteries are charged using a plug-in charging cable. Other types include Hybrid EVs, which can be recharged like a PEV and also by on-board engines, solar panels, reactors, or other energy generators. In this disclosure, PEV indicates a wired plugged-in EV, and EV is used to indicate a wirelessly charged EV.

The EVSE and PEV connections, electrical characteristics, communications methods, communications messages, and control methods are defined by several standards, specifications, reports and guidelines including ISO 15118-1,-2 and -3 in Europe and SAE J1772, J2847/1, /2 & /3, J2931/1 & /4 in North America as well as IEC 61851-1.

When the PEV's batteries are charged using an off-board charger, such as is the case for DC Charging, the PEV and EVSE must communicate in order to properly charge the PEV's batteries and bill for the energy consumed. The previously referenced documents, particularly SAE J2931/4 and ISO/IEC 15118-3, specify power line communications (PLC) for communicating between the EVSE and the PEV over the charging cable. These references normatively reference HomePlug® Green PHY v1.1 as the physical layer (PHY) and medium access layer (MAC) specifications, which is hereby incorporated by reference herein in its entirety, including its revisions. In parking garages and parking lots where there are multiple charging stations near each other or where one EVSE simultaneously controls multiple charging cables, there is a need to make sure that crosstalk between EVSEs and EVs, or intentional spoofing, does not cause an EVSE to charge (energize) or bill the wrong PEV. Therefore, HomePlug® Green PHY v1.1 includes a Signal Level Attenuation Characterization (SLAC) mechanism for determining to which EVSE a specific PEV is attached. The process of correctly pairing the right EVSE and PEV is called "Association" or "Matching". The process of double checking the association and/or matching decision is called "validation".

Documents such as ISO/IEC 15118-7 & -8 and SAE J2954 specifying a wireless method of charging PEVs, or in this case, plug-less "EV"s. As used herein, the term EV distinguishes the wirelessly charged EV from the wired plugged-in electrical vehicle (PEV) charging method, even though both forms may be incorporated into a PEV or EV.

In wired charging applications, the EVSE connects to a PEV using a cable with a coupler (electrical plug) on one end, plugged into the PEV's inlet (receptacle). In DC charging, the charger is "off-board" meaning it is not within the PEV. The PEV contains a battery charging system and a battery and they are therefore "on-board."

In order to reduce the cost and weight of the charging cable, three types of communications are used on a single wire and ground pair: amplitude level signaling, 1 kHz duty cycle pulse width modulation (PWM) signaling, and power line communications (e.g., HomePlug Green PHY v1.1). In wired EVSE designs, the wire that supports these three communications methods is the "Pilot Line," "Pilot Control" wire or "Pilot" wire. In locations where there may be many EVSE charging stations or one EVSE charging multiple PEVs, there may be crosstalk between charging cables or there may be deliberate electronic spoofing to avoid billing charges. There may also be leakage of the PLC signal into other EVSEs using the same electrical supply line. To address this potential issue, wired charging systems use a Signal Level Attenuation Characterization (SLAC) method as specified in HomePlug Green PHY v1.1 and shown in FIGS. 1A and 1B to make sure the Charger and the PEV it charges are the correct pair, i.e., "Associated" and/or "Matched".

Figure 1B:
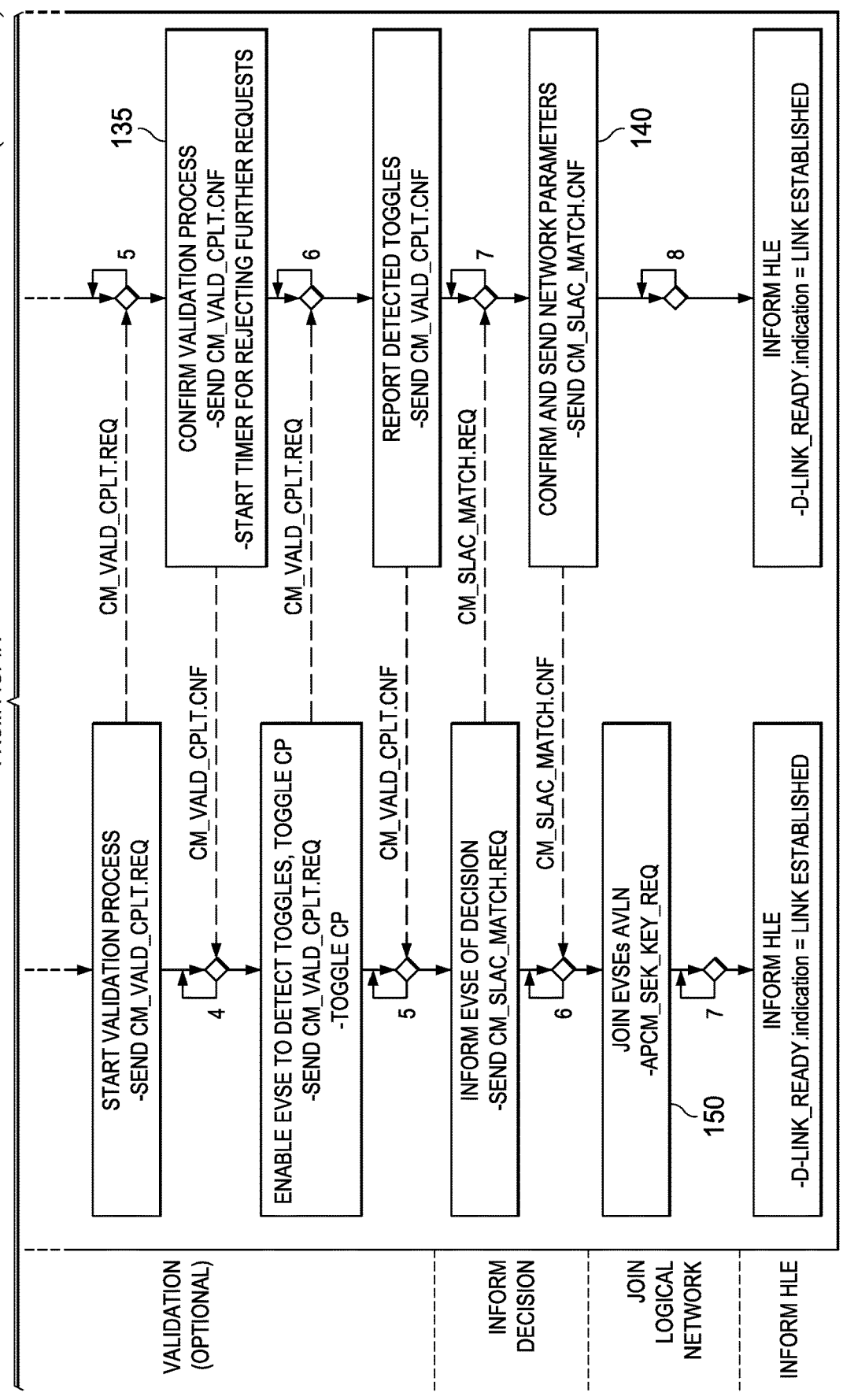

The PLC signal loss between multiple EVSEs 106 is typically about 30 dB, which is a significant loss. That characteristic loss is used by the SLAC protocol to select the closest wired EVSE. As illustrated in FIGS. 1A and 1B, when triggered, the SLAC protocol 100 first sets up some basic parameters 110 such as, whether security encryption will be used. In addition, the initial set up can set the PEV 107 to never become a network central coordinator (CCo) and initializes the EVSE 106 to always be the CCo.

The PEV then broadcasts a sounding message 115 to request all available (unassociated or unmatched) EVSEs to respond to a request from the PEV to associate with it. The request is sent by a multi-network broadcast (MNBC) message because at this point, the PEV is not yet associated with a network and this method allows the PEV to solicit responses from EVSEs that may be in other neighboring networks but might also be the EVSE to which the PEV is currently connected. The message is sent multiple times to make sure as many available EVSEs as possible hear the request. Available EVSEs that hear the request, and are not currently Associated with a PEV, respond with their identity and a number representing the difference between the PEV's expected signal strength and the signal strength it actually received 120 averaged over all the received messages. This difference is also calculated 130 over sub-bands of the entire PLC band to make the result less susceptible to narrow band noise and signal fading. The reported difference is the signal level "attenuation" term used in the SLAC acronym. The EVSE with the lowest average PEV signal attenuation is determined to be the one most likely to be directly connected to the PEV and the devices associate 140. If the attenuation is larger or smaller than a predetermined range, the SLAC process automatically restarts or the charging session initiation terminates. If the lowest attenuation (largest received signal) reported by all of the EVSEs is larger than the predetermined range (i.e., indicating more attenuation than expected), it may indicate that the closest EVSE is not responding to the request. If the difference between the attenuation reported by a plurality of EVSEs is too small, the PEV may not be able to make a decision. In these cases, some protocols (such as ISO/IEC 15118-3), use an optional validation step 135. Validation uses an out-of-band (non-broadband PLC) method such as toggling the voltage level on the Pilot Wire to assess whether the PEV has selected the right EVSE with which to associate.

Once associated, the EVSE and PEV initiate a private PLC local area network and charging messages and signaling can begin 150. Once associated, the EVSE will not respond to other request to associate until released from its prior Association (e.g. until the previous charging session ends, the PEV is disconnected or a system fault occurs and terminates the session).

For additional details of how SLAC operates, refer to section 13.8 of the HomePlug Green PHY v1.1 specification.

Figure 2:
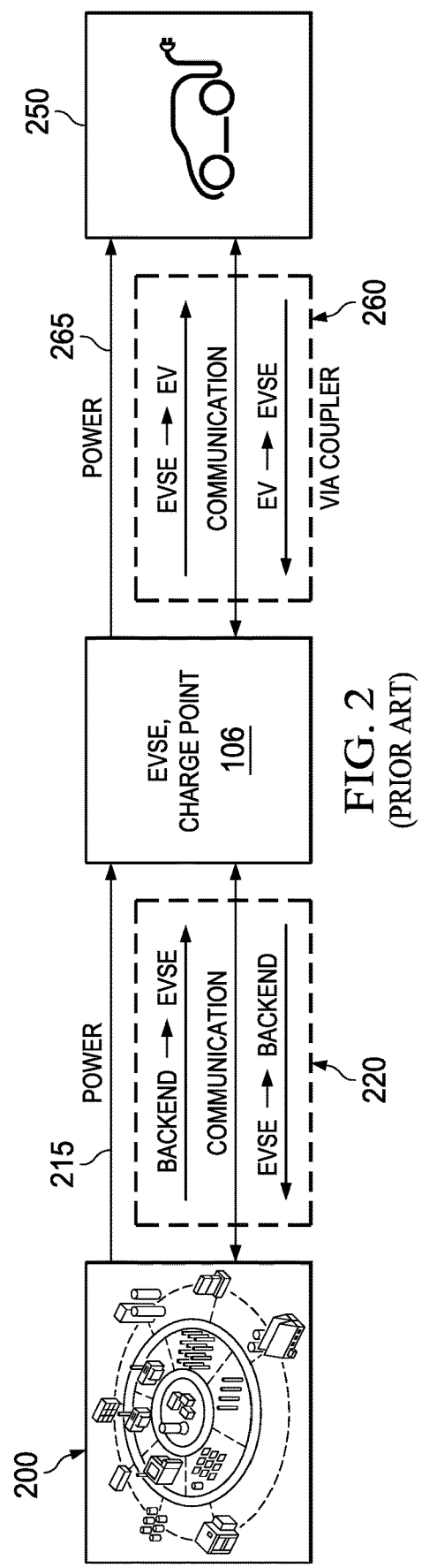
FIG. 2 illustrates an architecture of a prior art wired charging system.

An example charging system is shown in FIG. 2. In this example, the EVSE 106 is connected to the left to an electrical supply of power 215, which is connected to the utility infrastructure 200, and communications link 220. The communications is used, for example, to exchange information about billing, tariffs, capabilities, and the management of the AC supply power and the EVSE, usually referred to as "Backend" services. The Plug-in EV 250 connects to the EVSE through the power cable and coupler (plug) 260. This cable connects the charging energy, management signals and communications functions to the Plug-in EV 250.

Figure 3:
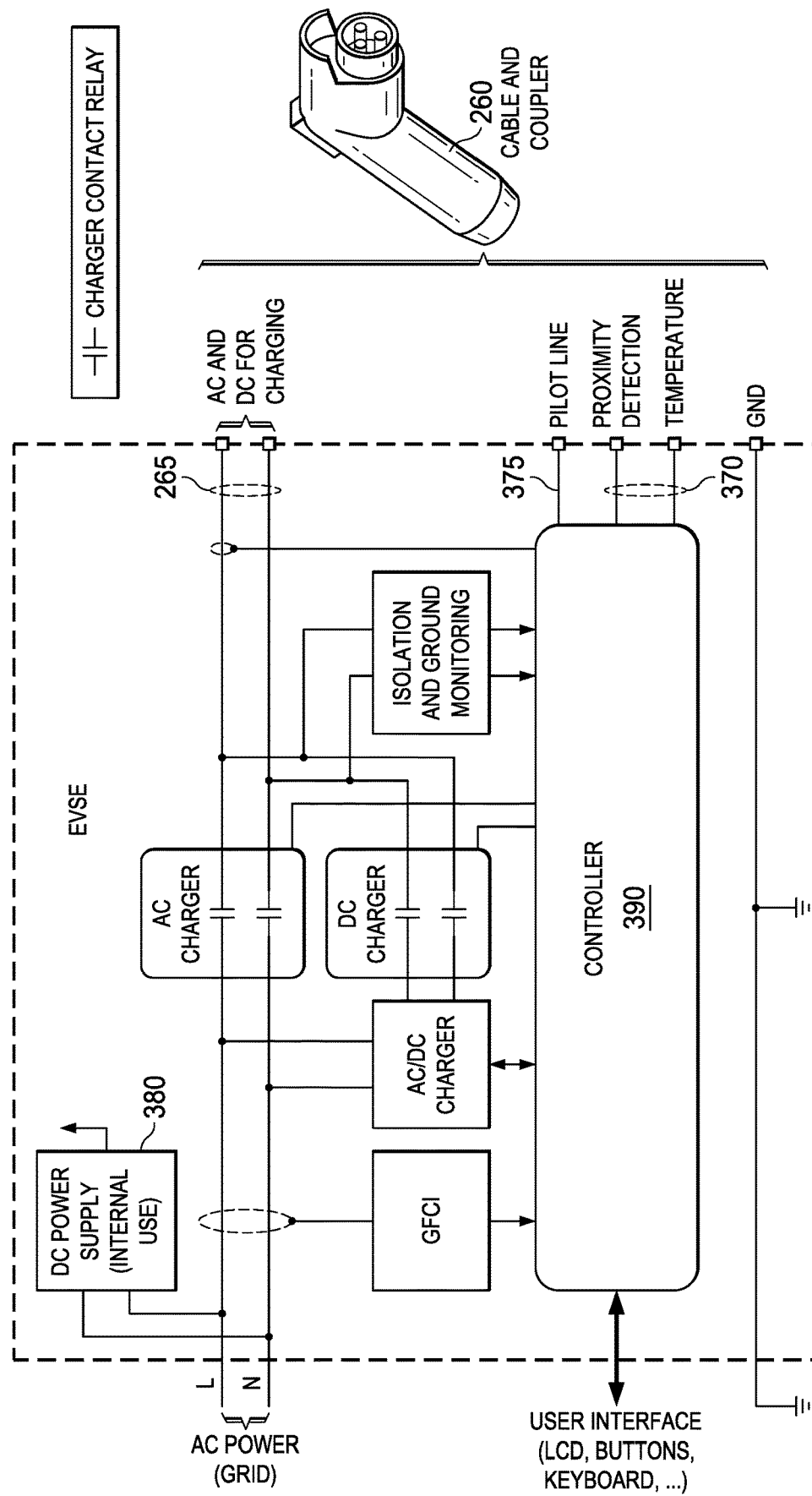
FIG. 3 illustrates a block diagram of a prior art wired charging system.

FIG. 3 illustrates an example of what is inside of an EVSE including its internal AC-to-DC power supply 380; the computer controller 390 comprised of a CPU, memory, firmware and software; charging process communications interfaces including power line communications; the charger energy controls, sensors 370, and the external communications interfaces 375.

Figure 4:
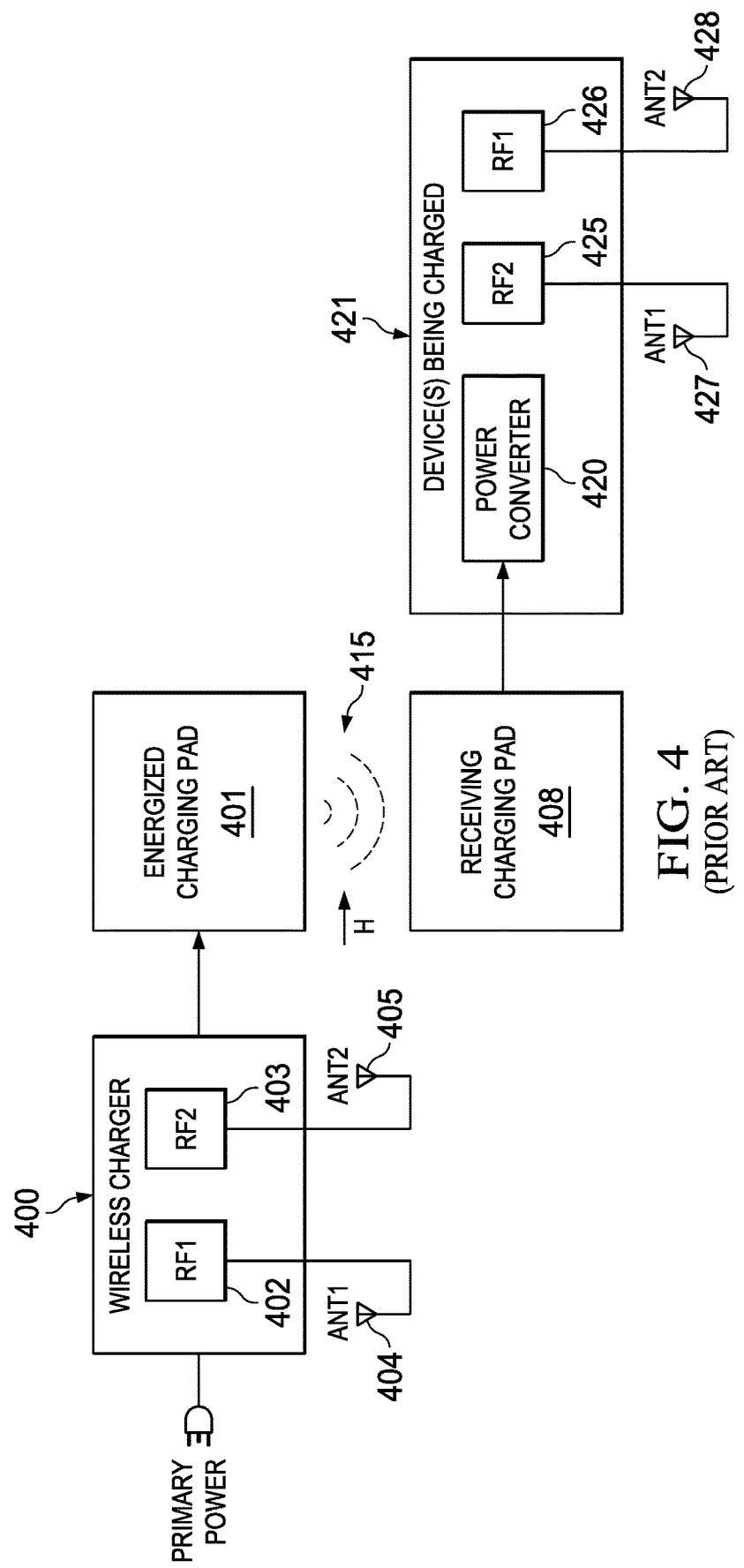
FIG. 4 illustrates a block diagram of a prior art wireless charging system.

In wireless charging systems, such as those shown in FIG. 4, an EV aligns a wireless charging pad 408 located under its chassis over a charging pad 401 energized by a wireless EVSE. Magnetic field induction is used to couple charging energy between the energized charging pad and the receiving charging pad. "Charging pad" is a general term describing the inductors or array of inductors and other circuits that wirelessly couple energy between the EVSE and the EV. The charging pad is also commonly referred to as "charging coil(s)" and by several other names. Energy flow is typically from the EVSE (energized charging pad) to the EV (receiving charging pad) to the EV's on-board charge controller and batteries. However, EVs being used as distributed energy resources (DERs) can reverse the energy flow direction and the EV's charging pad becomes the energized charging pad.

In an example, an AC power signal is applied by the wireless EVSE to the energized charging pad of the EVSE and is inductively coupled into the receiving charging pad of the EV. The received energy signal is converted by the EV into charging energy for EV. The frequency of the energy signal and its power levels are determined by the application, but it is important that the energized charging pad are electrically tuned to the receiving charging pad in order to transfer the maximum amount of energy. Charging pads with large figures of merit (Q) have a very narrow resonant frequency range and tuning further improves signal coupling efficiency. The charging pads also have to be aligned in two or three dimensions to maximize the transfer of energy.

Wireless charging systems use wireless communications to communicate between the wireless EVSE and the device (or devices) (e.g., an EV) being charged. This is because EV batteries that are charged with external (off-board) chargers need to communicate with the charger. For example, charging an EV from an off-board charger and on-board battery charging system requires them to communicate data including charging, identity, and billing data. Charging data may, for example, include how much charge is needed by the batteries (charge status), charging state, what type of battery is being charged, battery temperature, and user preferences (e.g. cost of charging and when the charging should be complete). Other data communicated between the EVSE and EV (wired or wireless charging) may indicate the EV's identity, how the energy is billed, or a cost projection for the charging session. SAE specifications such as J2847/6, J2836/6, and J2831/6 are examples of messages, general use cases, and protocol requirements for wireless charging and herein incorporated by reference. To communicate between the wireless charger and device being charged, wireless charging systems (that is, wireless with respect to the absence of a "metallic" (wired) connection to transfer charging energy) use wireless communications means such as DSRC (digital short range communication), forms of IEEE802.11 (e.g., Wi-Fi) or other wireless means to communicate these messages. Typically, two wireless communications techniques are used. One for detection of the charging system and secondly for communications of charging message and other data.

As illustrated in FIG. 4, a wireless charger 400 is connected to a source of primary power. This is typically, but not limited to, an AC power line. In this example, a wireless communications means 402 transmits a signal through a first antenna 404 to detect the presence of an EV which has a compatible wireless communications means 426 and a first antenna 427. Once the presence is detected, the second communications method 403, which is typically a bidirectional, faster and more capable signal is transceived by a second antenna 405, which is used to control the charging sequence in cooperation with a compatible wireless transmission means 425 via its second antenna 428. The charging sequence often includes checking the billing accounts, determining the status of the device being charged and any special requirements of the energy storage device which we generally refer to as a battery in this example, any error conditions, and so on as required by the charging process. The power converter 420 converts the power signal that is inductively coupled 415 from the energized charging pad 401 to the receiver charging pad 408, into charging (and system operating) energy used by the device(s) being charged 421.

Figure 5:
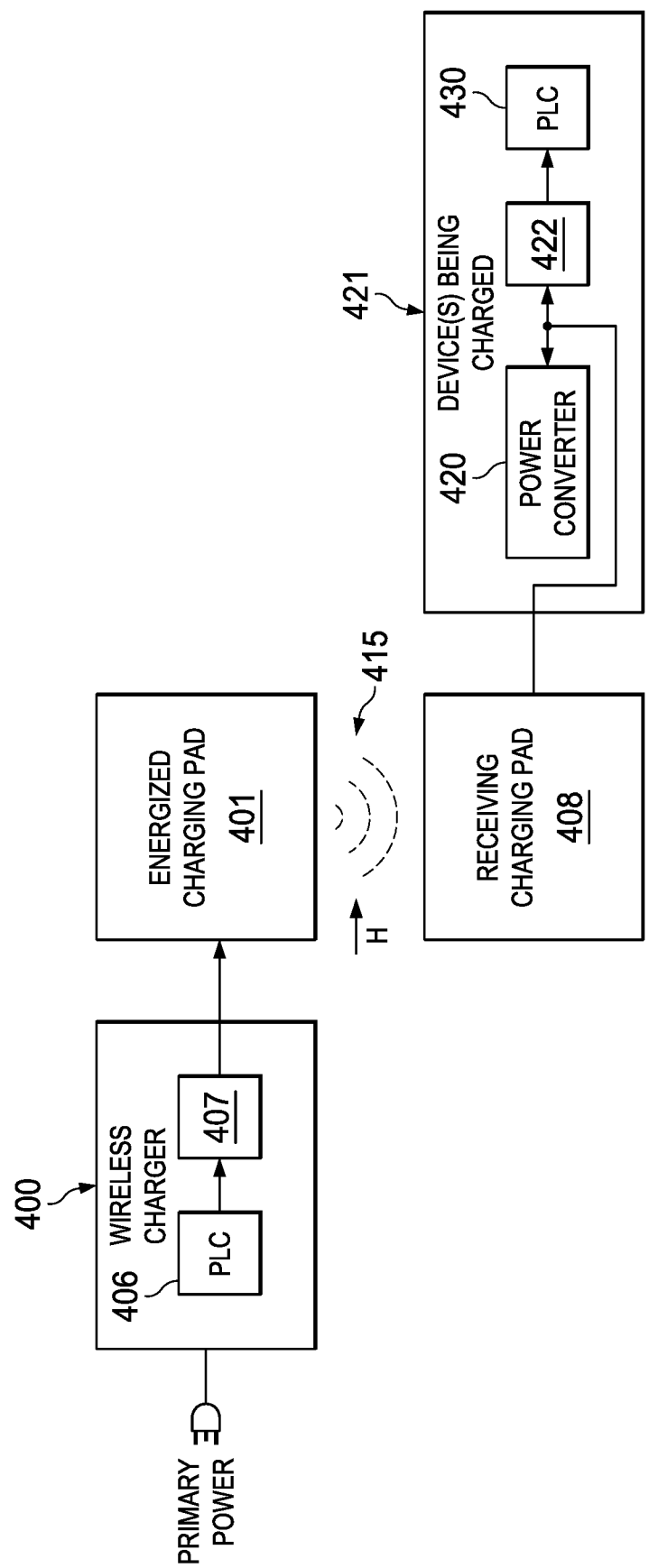
FIG. 5 illustrates a block diagram of a wireless charging system in accordance with some embodiments.

In an embodiment shown in FIG. 5, the wireless charger 400 includes a power line communication (PLC) transceiver 406. The wireless charger 400 may be coupled to the primary power source. The primary power source may be an AC power line, or other direct current (DC), photovoltaic, nuclear, or wind energy sources may also be used. The PLC transceiver 406 may use, but is not limited to, carrier frequencies from about 3 kHz to about 490 kHz (e.g., IEEE 1901.2) and from about 1.8 MHz to about 88 MHz (e.g., IEEE 1901). The specific frequencies and bandwidths are selected based on application, physical and regulatory constraints.

The PLC signal is coupled into the energized charging pad 401 through a coupling circuit 407 which provides impedance matching, filtering, surge protection, and other related functions. The PLC signal couples into the energized charging pad 401 and couples into the receiver charging pad 408, regardless of whether the energized charging pad has a charging signal on it or not. That is, the name Energized Charging Pad only indicates that it is connected to the charger, and not a reflection of its energy state. PLC systems may be designed to work on the energized or non-energized wires that connect between the wireless charger 400 and the energized charging pad 401.

When the PLC signal is coupled into the receiver charging pad 408, it is coupled through the coupling circuit 422 and into the PLC node 430 within the device being charged 421 and establishes a PLC communications link as defined in the referenced PLC standards. The link can also be initiated in the opposite direction. In an embodiment, the PLC communication through the PLC nodes 406 and 430 provides control signals to the power converter 420 to control the charging process. The energized charging pad 401 and the receiver charging pad 408 have to be aligned auto-mechanically, electrically, and/or manually in two or three dimensions to maximize the transfer of energy. Specific embodiments of alignment processes are described further below.

Figure 6:
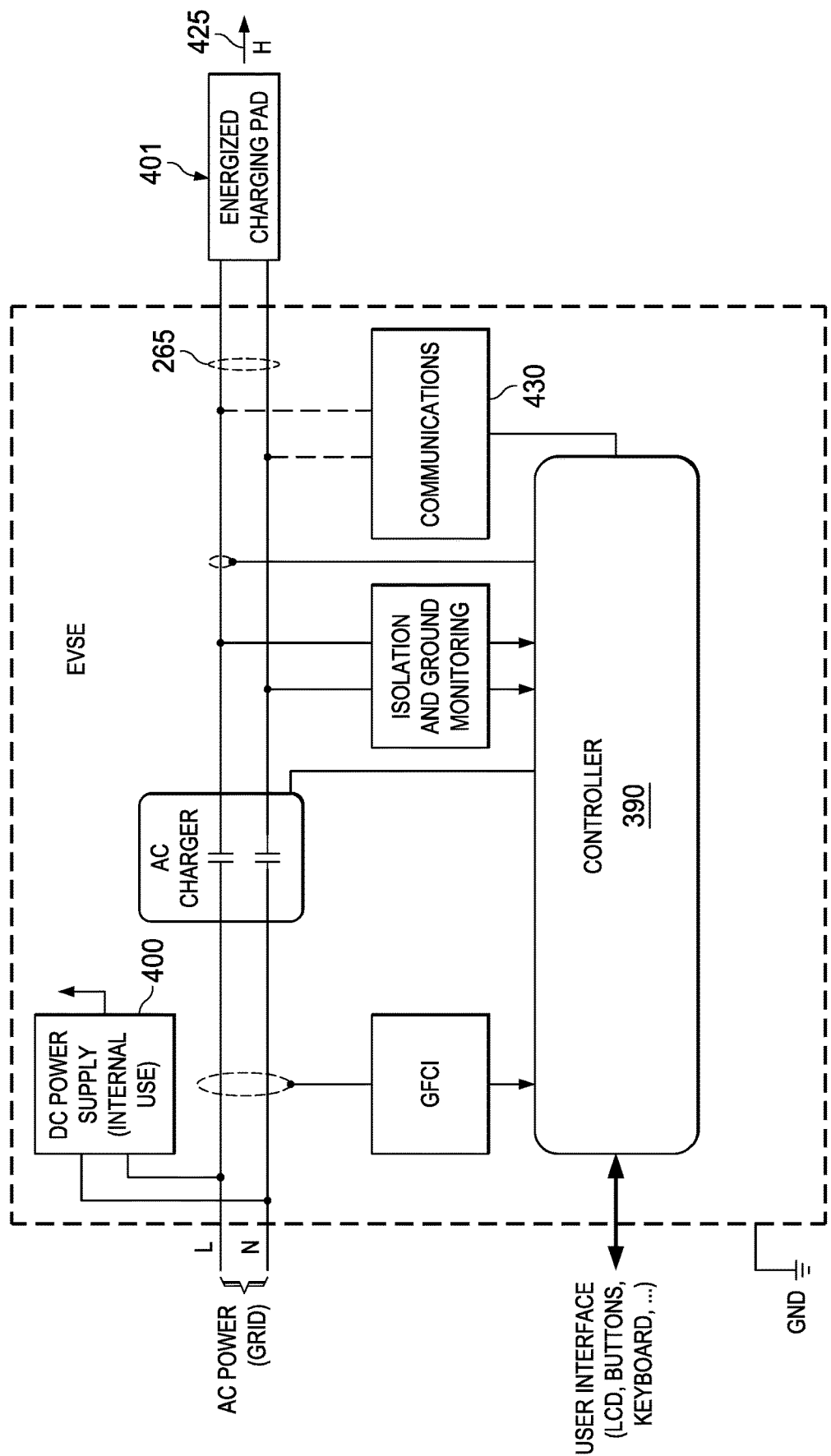
FIG. 6 illustrates a block diagram of a wireless charger of a wireless charging system in accordance with some embodiments.

FIG. 6 illustrates components of the wireless charger 400 (sometimes referred to as a wireless EVSE) of a wireless charging system using the charging pad 401 that replaces FIG. 3's cable and coupler 260. Because the cable (wires) do not exist in wireless charging, all of the messages and the signals 370 for charging the vehicle are communicated by wireless means 430 such as power line communications protocol modulating the charging energy's magnetic field 425. This magnetic field 415 is then coupled to the receiving charging pad (see 408 in FIG. 5). In some embodiments, the wireless means 430 may be similar to the PLC node 406 and the coupler 407 of FIG. 5. In other embodiments, an optional antenna may be included such that an electromagnetic method may be utilized such as Bluetooth, Wi-Fi, cellular, dedicated short-range communication (DSRC), near-field communication (NFC), the like, or a combination thereof. In some embodiments, the communication may be performed using an optical communications method or other wireless method.

Figure 7:
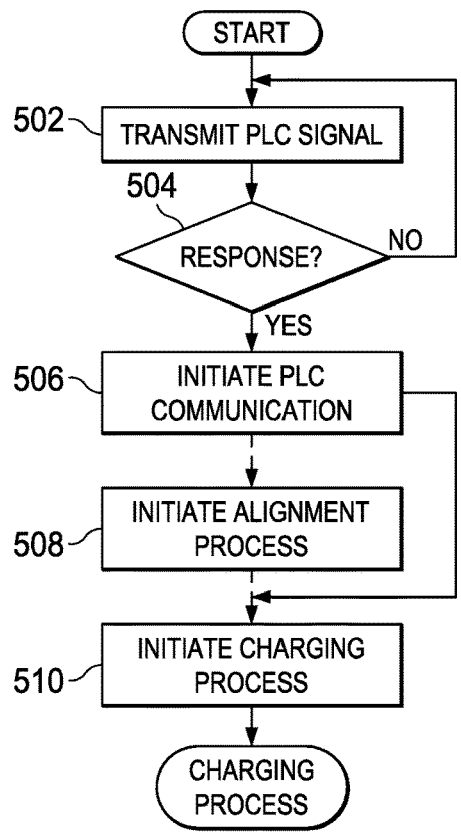
FIG. 7 is a process flow diagram illustrating a method of initiating a wireless charging process in accordance some embodiments.

The wireless charging process can be initiated several ways. FIG. 7 illustrates an embodiment of initiating the charging process. Step 502 includes transmitting the PLC signal from the wireless charger (e.g., 400 in FIGS. 5 and 6) to the device being charged (e.g., 421 in FIG. 5), if present. In some embodiments, the PLC signal may be transmitted periodically. Step 504 includes checking if the PLC signal was received by the device being charged by way of an acknowledgement or response from the device being charged. If the acknowledgement and/or response to the PLC signal is not received, the process loops back to step 502 and steps 502-504 may be repeated until an acknowledgement and/or a response from a device being charged is received at the wireless charger. If the acknowledgement and/or response to the PLC signal from the device being charged is received by the wireless charger, then the process proceeds to step 506 which includes initiating the PLC communication between the wireless charger and the device being charged. The communication link between the wireless charger and the device being charged may be over a very short distance. Optional Step 508 includes aligning the charging pads of the wireless charger and device being charged. The optional alignment Step 508 may be performed using one or more of the alignment methods and approaches described below in FIGS. 10-B and 11A-C through 14. Step 510 includes initiating the charging process(es) of the device being charged. If the PLC signal is lost, the charging process may be terminated.

Figure 8:
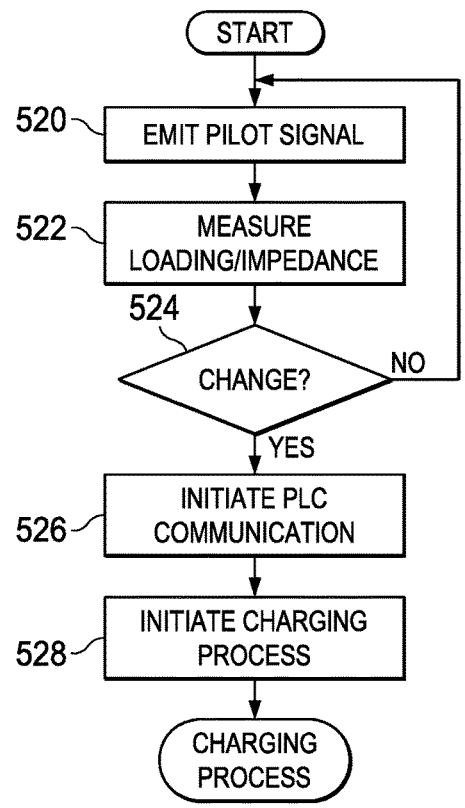
FIG. 8 is a process flow diagram illustrating a method of initiating a wireless charging process in accordance another embodiment.

FIG. 8 illustrates another embodiment of initiating the charging process between the wireless charger (e.g., 400 in FIGS. 5 and 6) and the device being charged (e.g. 421 in FIG. 5). Step 520 includes the wireless charger emitting a PLC or power pilot signal (low level) signal on the energized charging pad (e.g., 401 or 408 in FIG. 5). Step 522 includes measuring the loading and/or impedance of the energized charging pad. Step 524 includes determining if the measured loading and/or the impedance of the energized charging pad changed. If the loading and/or impedance of the energized charging pad did not change, the process loops back to step 520 and the steps 520-522 may be repeated until a change is detected. If the loading and/or impedance of the energized charging pad did change, the process proceeds to Step 526, which includes initiating PLC communication between the wireless charger and the device being charged. The change in the loading and/or impedance of the energized charging pad may be used to detect the presence of a device being charged due to a receiver charging pad on the device being charged being in intimate proximity with the energized charging pad. Step 528 includes initiating the charging process(es) of the device being charged. Although not shown, this process may also include an aligning of the energized charging pad(s) and the receiver charging pad(s) before beginning the charging process.

In another embodiment, the power signal (either full or partial power level) can be inducted into the receiver charging pad (as opposed to the energized charging pad) and the power signal detected by the devices being charged. The PLC communications can them be initiated and the charging process initiated.

Figure 9:
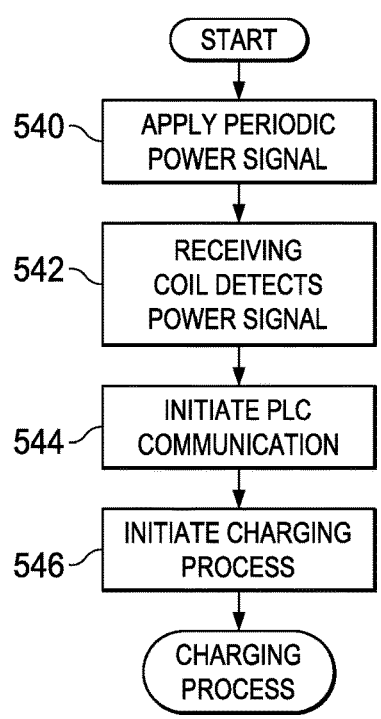
FIG. 9 is a process flow diagram illustrating a method of initiating a wireless charging process in accordance some embodiments.

FIG. 9 illustrates another embodiment of initiating the charging process between the wireless charger (e.g., 400 in FIGS. 5 and 6) and the device being charged (e.g., 421 in FIG. 5). Step 540 includes a full power signal periodically applied to the energized charging pad (e.g., 401 or 408 in FIG. 5). Step 540 may include setting the power signal period by a time delay function. The time delay may be set to respond quickly enough to satisfy a car owner's desire for quick sensing response and for a duration that is long enough to be accurately detected. The time delay is also sufficiently large and the duration sufficiently short, to save energy and minimize potential magnetic or electromagnetic noise. Step 542 includes the receiver charging pad (e.g., other of 401 or 408 in FIG. 5) and power converter detecting the presence of the full power signal periodically applied to the energized charging pad. Once detected by the receiver charging pad, the process proceeds to Step 544, which includes initiating PLC communications and to Step 546, which includes initiating the charging process.

Because the magnetic coupling between charging pads happens over a very small distance, there is a low probability that multiple EVs that are next to multiple energized charging pads will cross talk and be misassociated. This solves the association ambiguity found in RF-based communications systems. If multiple systems happen to be close by, the SLAC (Signal Level Attenuation Characterization) protocol taught in the HomePlug Green PHY 1.1 specification, incorporated herein by reference, can be used to correctly associate EVs and charger charging pads.

In some embodiments, the PLC signal to noise ratio (or henceforth, simply the signal level or a combination of signal and signal to noise ratio) can be used to indicate the best alignment between charging pads.

Figure 10A:
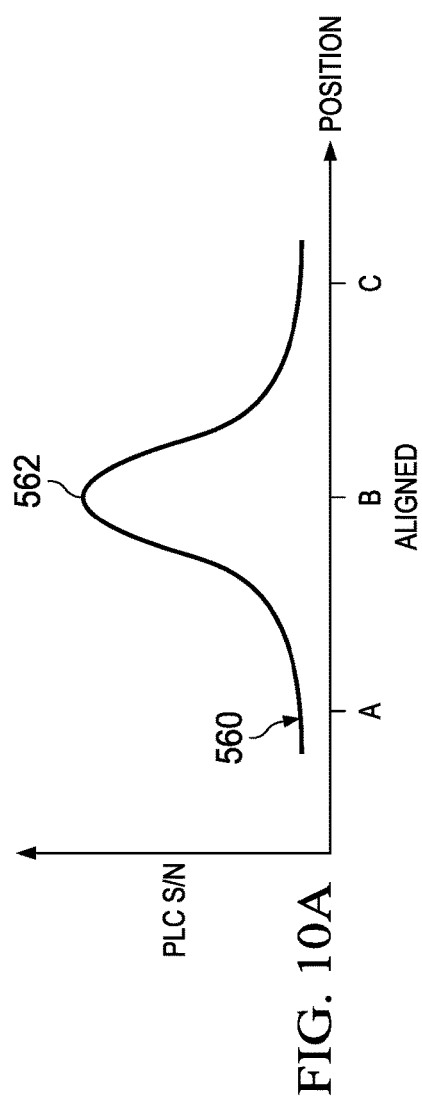
FIG. 10A-B illustrate using a power line communication (PLC) signal to align coils of a wireless charging system in accordance with some embodiments.
Figure 10B:
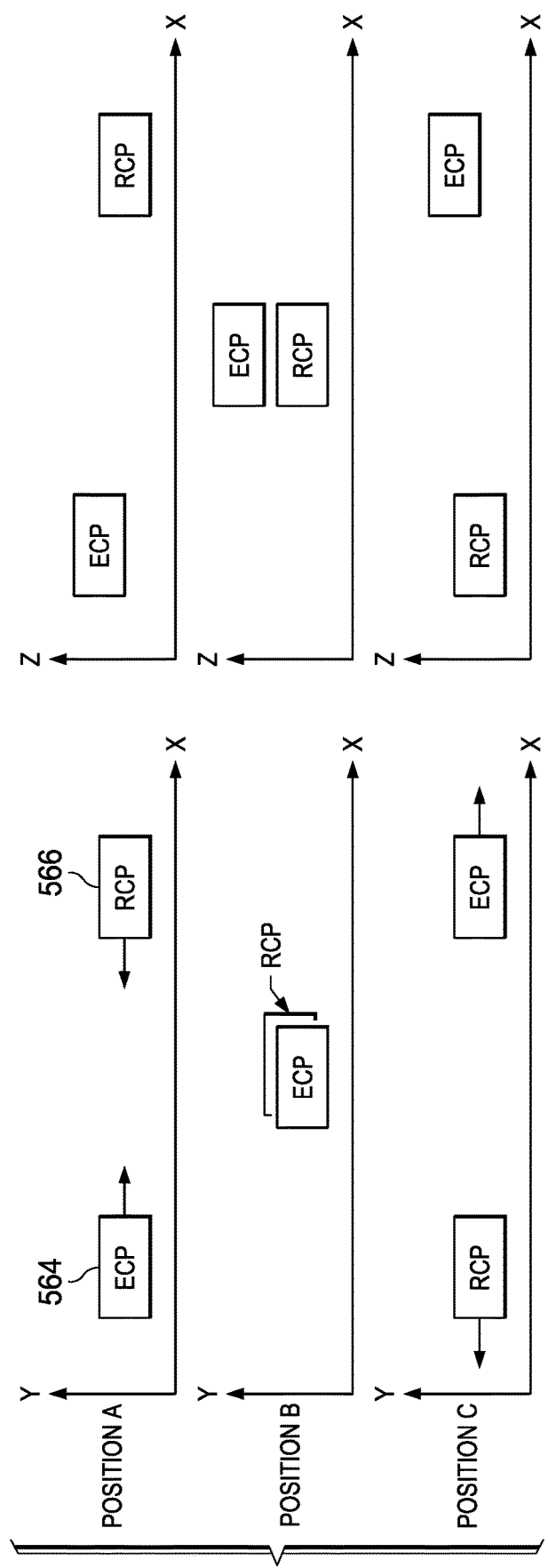

FIG. 10A illustrates a signal to noise ratio (S/N) of a PLC signal 560 when the charging pads 564 and 566 of FIG. 10B are in positions A, B, and C of FIG. 10B. As illustrated in FIGS. 10A and 10B, when the energized charging pad (ECP) 564 is not aligned with the receiver charging pad (RCP) 566 as in positions A and C, there is little PLC signal 560. When the charging pads are perfectly aligned in the X, Y and Z axis (for simplicity, only the X axis variable is shown in FIG. 10A) the PLC Signal to noise ratio is at a maximum level 562. The higher the signal to noise ratio, the better the alignment and the power signal coupling. Because the PLC signal is applied to the entire energized charging pad (which may comprised of an array of smaller charging pads), the signal to noise ratio of the PLC signal provides an alignment measure based on the entire charging pad without the need for specific RF alignment-antenna structures in the charging pads. However, it is within the scope of the present disclosure that if PLC communications is required before the charging pads come within range, additional antennas could be added to the charging pads to increase the PLC magnetic field range.

Embodiments described above in FIGS. 5 through 10A-B may achieve advantages. In particular, these embodiments utilize PLC communication over the same charging pads used for charging the device to be charged. Because the PLC communication is applied to the entire energized charging pad (which may be comprised of an array of smaller charging pads and/or coils), the channel estimation and/or signal-to-noise ratio of the PLC communication provides an alignment measure based on the entire charging pad without the need for specific alignment structures in the charging pads and allows for fine tuning the alignment of the charging pads without extra alignment structures on or adjacent the charging pads. Another advantage of this embodiment is solving the problem of ensuring that the charger and the electric vehicle it charges are the correct devices, and not a neighboring device. This issue is referred to in the industry is charger to EV "Association." Because the PLC communications in the present disclosure are transmitted through the actual charging pads connected to the charger and EV and the charging pads need to be in close proximity with each other to communicate, the disclosed wireless charging system physically excludes multiple vehicles and/or chargers from cross-talking. Thus, the charger to EV association issue does not occur for the disclosed wireless charging system.

FIGS. 11A-C through 14 illustrate various views of wireless charging systems that further describe charging pad alignment, association, and validation. As discussed above, problems with wireless charging include the proper alignment of the energized and receiving charging pads and making sure that the EV is associated with the correct EVSE. Several alignment methods are being developed using radio, optical, or physical location detection and alignment methods. Radio methods suffer from poor position resolution, security issues, and the potential for interfering with other nearby EVSE and communications systems. Optical systems such as LEDs and lasers comprised of emitters, sensors in conjunction with transmissive or reflective location methods do not work reliably in dirty and snowy environments. Physical positioning means defeat the advantage of wireless charging and are unreliable, vehicle dependent, or expensive for outdoor environments. A better solution is needed in the form of a contactless apparatus and method that provides for excellent coarse and fine charging pad alignment and is user friendly.

As discussed above, in wireless charging systems, all of the communications and signaling between the EVSE and the EV has to be wireless (e.g., by magnetic field, electromagnetic field, and/or optical communications). A wireless signal suffers from a variety of attenuation and signal disturbances due to absorptions and reflection from mobile and stationary devices in addition to multipath issues. Consequently, the SLAC signal level attenuation method previously described does not work reliably for wireless charging pad association using traditional RF signals and communication protocols.

In addition, the alignment of the energized and receiving charging pad of a wireless charging system is critical for the efficient transfer of energy. Generally, the industry considers two types of alignment: coarse and fine. Coarse alignment normally refers to aligning the charging pads near each other and fine refers to optimizing the coupling between coarsely aligned charging pads. In this disclosure, "alignment" means both coarse and fine alignment unless specifically described as coarse or fine. The industry is attempting to design charging pads that are less sensitive to alignment accuracy or that otherwise simplifies the alignment process. Many types of coil structures (e.g., loop, spiral, and combinations of different structures in a variety of array topologies) are being evaluated and may result in very complicated magnetic field patterns. However, regardless of the charging pad structure used, the charging pads still have to be physically aligned.

Alignment of the energized and receiving charging pads may be achieved in a number of ways. One method is by visual inspection, such as by driving over the pads and following visual cues such as alignment targets or physical cues such as wheel guides, wheel chocks, or indentations in the parking surface. Alignment can also be achieved using RF (e.g., as disclosed above) and optical location techniques to indirectly indicate how to align the charging pads. The optimum alignment of the charging pads is determined by the maximum power transfer between the charging pads. For safety (and billing) reasons, the full charging currents are not energized until after the alignment and association (and optional validation) processes are complete, however, a minimum charging current or a communication current in the charging pad can create a magnetic field that can be used to align the charging pads. This method provides a real time transfer of data which can indicate the optimal alignment 562 for the EV's current bearing as shown as FIG. 10A, but no proactive guidance about how to align the charging pads (e.g., "move left one foot and forward two feet".

These embodiments provide solutions for problems associated with charging pad alignment, association, and validation in wireless charging systems.

Some of these embodiments use a magnetometer in a digital or analog electronic compass to sense the energized charging pad's magnetic field that transfers energy from the EVSE to the EV. In some embodiments, the EV knows where the EV's electronic compass sensor is located with respect to where its receiving charging pad is most sensitive to the energized charging pad's magnetic field. When the electronic compass detects the magnetic field maxima, in some embodiments, the user is instructed through a user interface about how to steer the EV into proper alignment. In some embodiments, the EV autonomously steers itself into the proper alignment. In some embodiments, the EVSE charging pad, the EV charging pad, or both autonomously move themselves into proper alignment. The electronic compass may be affixed to the charger, the device being charged (e.g., EV), or both.

Figure 11A:
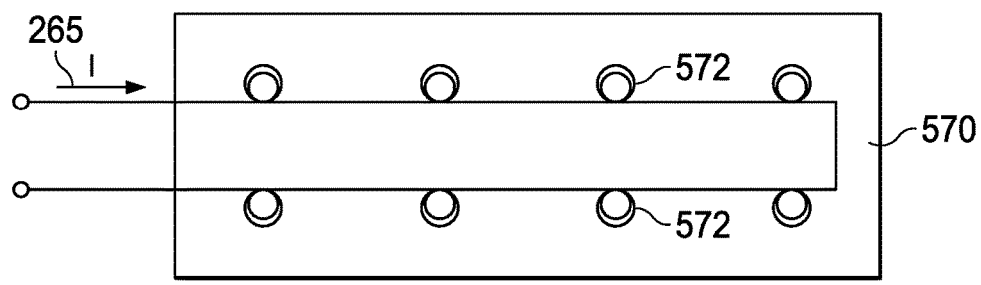
FIG. 11A-C illustrate the magnetic field strength associated with a multi-coil charging pad in accordance with some embodiments.
Figure 11B:
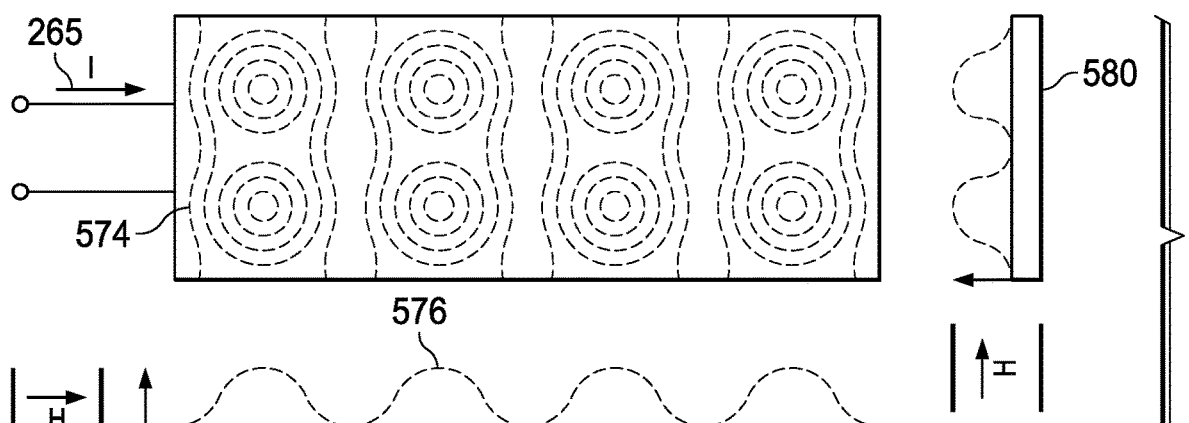
Figure 11C:
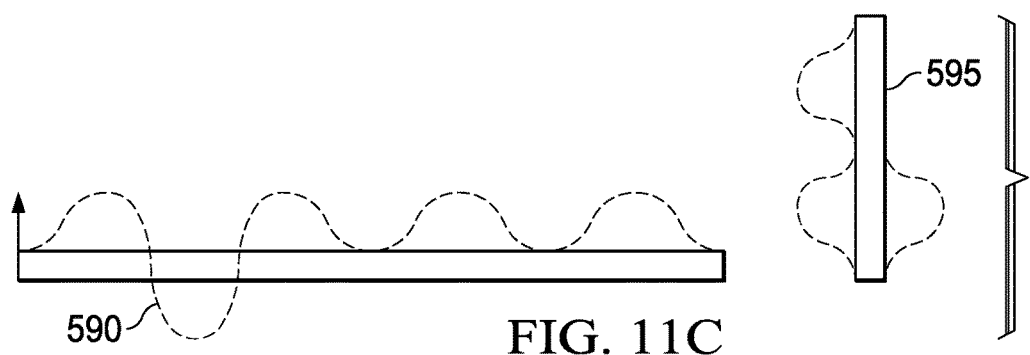

As illustrated in FIGS. 11A, 11B, and 11C, a magnetic field strength varies over the surface of a charging pad 570 and also varies over distance from its surface. It may be designed to have multiple coils 572 and consequently have multiple magnetic field maxima and sensitivity areas, the characteristics of which are related to the Figure of Merit or "Q" of the circuitry.

FIG. 11A illustrates a charging pad 570 that is energized by EVSE charger current 265, which may be a different from, but the same function as the charge currents in FIG. 6. The magnetic field topographic map representing lines of equal field strengths is represented in FIG. 11B as circular patterns 574 from the top view and undulating field strength values 576 as shown in the side view 578 and end view 580. These field strengths are represented at the positive peak of the AC charging current. Note that it is possible to reverse the direction of current through the coil or design a coil that is wound counter direction to the other coils so that at an instant, it represents a reverse field 590, 595 as shown in FIG. 11C. The reverse field can be used to help orient the charging pad, and improve alignment.

Figure 12:
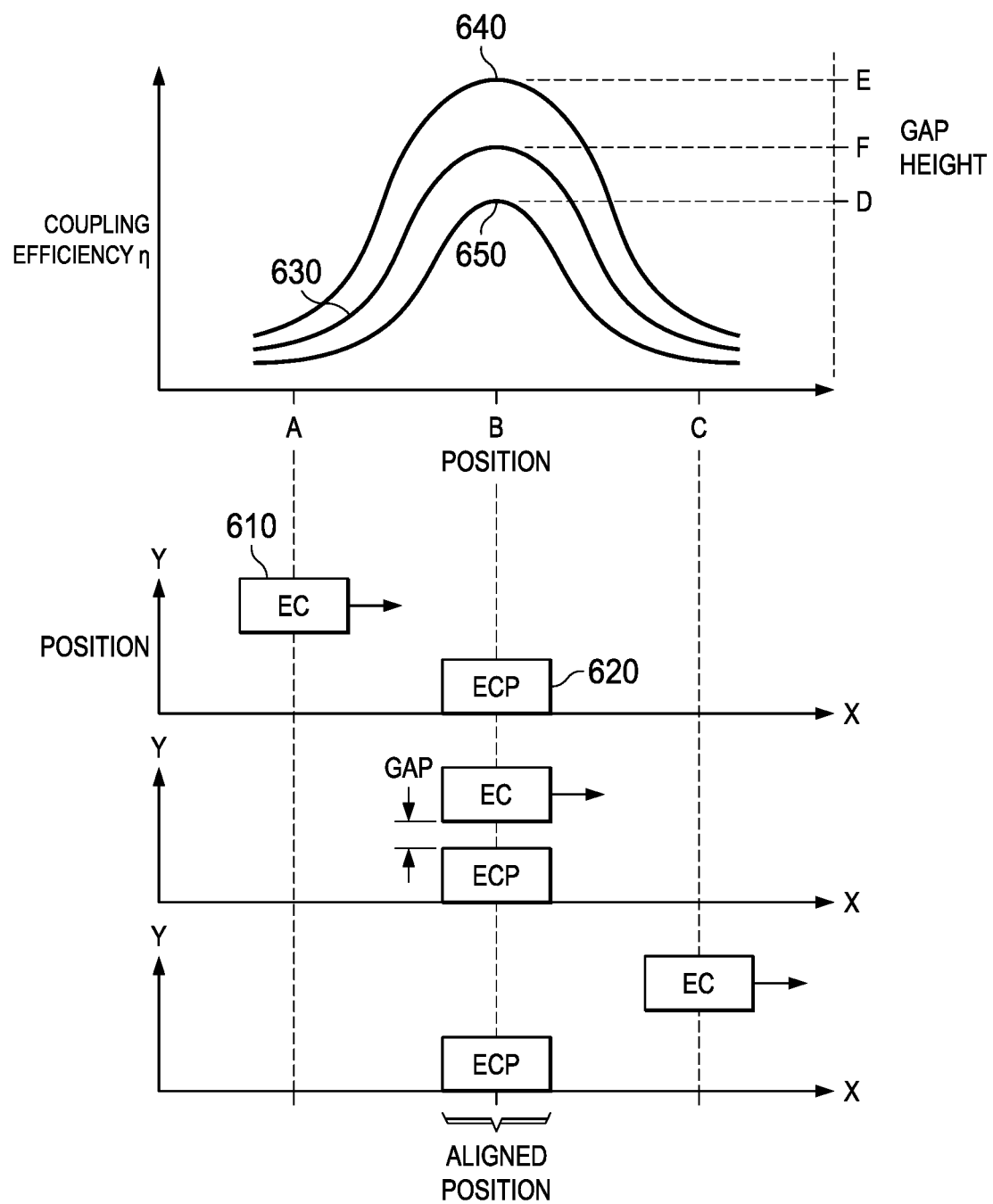
FIG. 12 illustrates the energy coupling efficiency related to the relative position between charging pads in one dimension in accordance with some embodiments.

FIG. 12 illustrates the one-dimensional result of passing the electronic compass (EC). 610 over a single coil energized charging pad (ECP) 620. The curves are shown as continuous lines but the magnetometer samples at a rate fast enough to compensate for the motion of the device and the frequency of the magnetic field. As the electronic compass transverses the magnetic field, the field strength and orientation (magnitude and vector) (630, 640, and/or 650) are sensed by the electronic compass (EC), communicated to the controller an electronic interface such as an I²C serial bus interface, and stored in memory. The peak coupling efficiency, η, is when the receiving coil pad's most sensitive location is aligned with the energized pad's H-field maxima. In an embodiment where the EC 610 is affixed to the device being charged (e.g., EV), the peak coupling efficiency is when the EC 610 and ECP 620 are aligned in position "B" in this example. The distance between the charging pads (the gap) is also important. At low gaps, the magnetic field may not properly align with the receiving pad coils and result in a lower coupling efficiency as shown in gap height D, curve 650. There is a gap that results in the best alignment as shown as gap height E, in curve 640. If the gap becomes too large, field strength is reduced such as shown by gap height F, curve 630. The gap height can be adjusted using a variety of methods including adjusting tire pressure, modifying the changing pad's magnetic field characteristics, or mechanically moving the charging pads with respect to each other.

In some embodiments, the electronic compass on the receiving charging pad uses 2-D (two axes) magnetic field strength detection to locate and track the location of the energized charging pad's magnetic field maximum or maxima. This provides better information, (e.g., the X and Y axes) information with which to generate the alignment data. In some embodiments, a 3-D (three axes) electronic compass' magnetometer includes vertical "Z" axis magnetic strength data to provide three dimensions of the magnetic field strength.

FIG. 12 further illustrates that as the electronic compass, such as the STMicroelectronics LSM303DLH, passes over the energized charging pad and it measures and records the magnetic field strength in 1, 2, or 3 axes. It can store the magnetic field data as a function of position. The relative position and movement of the charging pads with respect to each other can be determined by a number of methods including EV wheel rotation, GPS, optical and radio triangulation, time of arrival, and/or other ranging and position methods. If the field strength is determined to be stronger behind, to the left, to the right, above, and/or below the electronic compass, the relative position data is sent to the interface to indicate how to align the charging pads.

In some embodiments, the mobile charging pad (e.g. charging pad of the EV) may contain more than one electronic compass in an array. The data from these multiple electronic compasses can be used to map the magnetic field strength across a much larger area than a single electronic compass and can provide better alignment information. This is particularly useful when the charging pad's magnetic field has multiple maxima or the receiving charging pad has multiple peak sensitivity maxima. For example, a charging pad having six coils (six maxima) may be best detected by an array of six electronic compasses.

In some embodiments, the electronic compass includes an accelerometer. The accelerometer may include 1, 2, or 3 axes of acceleration data. When combined with the data from the electronic compass' magnetometer, the system can provide additional information such as dead reckoning where the optimum alignment was located and calculating the distance and direction the alignment adjustment needs to be.

Figure 13:
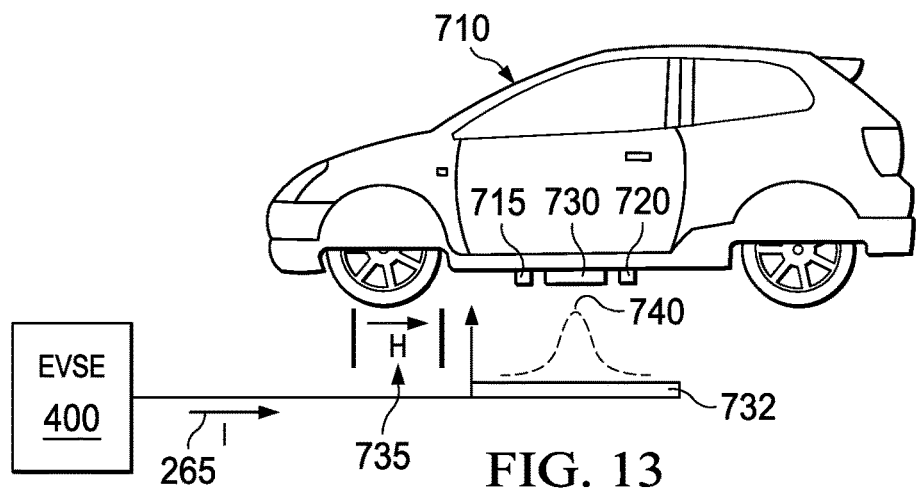
FIG. 13 illustrates an electric vehicle (EV) with multiple electronic compasses embedded in a charging pad assembly in accordance with some embodiments.

For example, FIG. 13 illustrates an EV 710 employing electronic compass devices 715 and 720 located on opposite ends of the charging pad 730 (e.g., on the charging pad's front-bumper (device "A" 715) and rear-bumper (device "B" 720) sides). The electronic compass detects, measures, and stores the peak magnetic field data when the electronic compass sensor "A" passes through an energized pad's 732 magnetic field 735 maxima 740 at a first point, and the electronic compass sensor "B" 720 passes through the energized pad's 732 magnetic field 735 maxima 740 at a second point. The acceleration data and the sensor's known position on the EV 710 with respect to the receiving charging pad's 730 location, the pad characteristics, and the first and second points are used in combination with time information provided by the controller to calculate the precise location of the energized charging pad's 732 magnetic field maxima 740 with respect to the receiving charging pad 730 and the adjustments needed to align them. This data provides precise alignment instructions to the user or EV through the user interface. In addition, the accelerometer data can be used to calculate the tilt of the electronic compass and used to correct the magnetic field calculations and magnetic field map.

In some embodiments, the accelerometer may be part of a system that also includes gyroscopes to provide inertial navigation positioning data to the system. This configuration provides additional information for calculating how to align the charging pads.

In some embodiments, a gyroscope is used to provide 1, 2, or 3 axes information that can be used in place of or in conjunction with the accelerometer. The gyroscope may be part of the electronic compass or external to it. As with the accelerometer and magnetometer, the data may be in analog or digital format.

In a 6-D electronic compass embodiment, the electronic compass may utilize any two of a magnetometer, a gyroscope, an accelerometer, or the like such as, for example, an electronic compass including a magnetometer and an accelerometer. In a 9-D electronic compass embodiment, the electronic compass may utilize any three of a magnetometer, a gyroscope, an accelerometer, or the like, such as, for example, an electronic compass including a magnetometer, a gyroscope, and an accelerometer.

In some embodiments, the magnetic field strength is measured by an array of electronic compasses. The data is used to map the magnetic field. If the shape of the energized pad's magnetic field is not compatible with the configuration of the receiving charging pad, the charging system accesses the magnetic field map (assumed in this example to be measured and stored in the EV) combines it with internally stored data about its own charging pad characteristics and calculates the best possible alignment. In some embodiments, the magnetic field map information is used to switch the charging pad's coil topology to optimize the energy transfer efficiency. Switching the topology may be done by switching between multiple co-located charging pads, switching which induction coils are used in a coil array topology charging pad in order to change the number and/or location of magnetic field maxima, directing current to the coils best aligned for maximum energy transfer, or other methods of changing the magnetic field sensitivity over the surface of the charging pad.

In some embodiments, the charging pad(s) does not have to be electrically energized. Instead, a magnet or array of magnets is made part the EVSE charging pad. The magnets may be permanent magnets or electromagnets. For electromagnets, its current is not necessarily part of the alignment, communications, or power transfer charging current and can be designed to be controlled separately. The electronic compass bases the alignment instructions on detecting the location of the magnetic field. To save energy, electromagnets may be turned on or off in response to detecting the presence of an EV.

Figure 14:
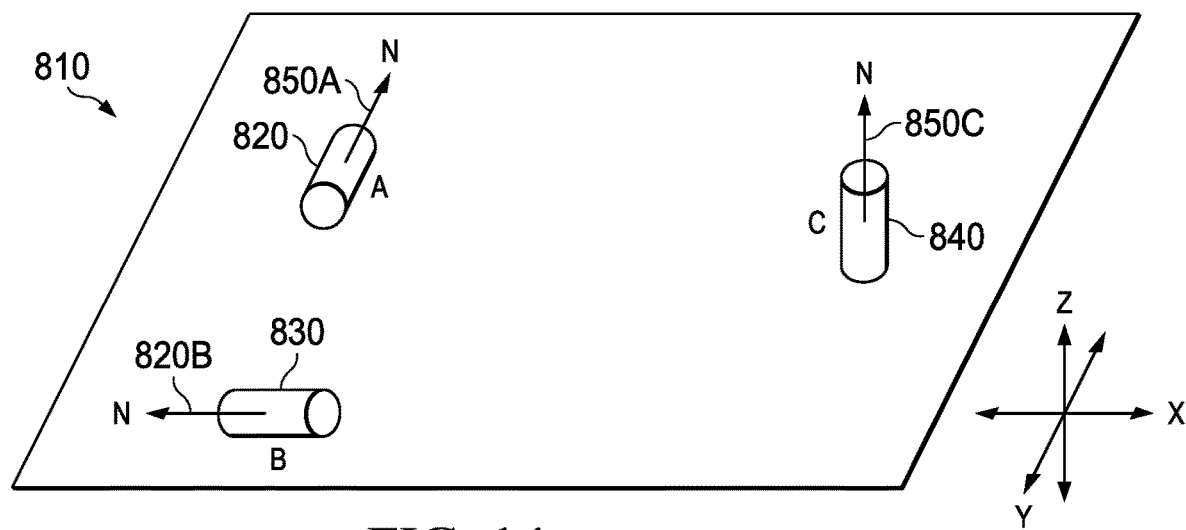
FIG. 14 illustrates pole orientations with a magnet in accordance with some embodiments.

As illustrated in FIG. 14, some embodiments may use a magnet or array of magnets 810 and orient their magnetic fields 820A, 830B, and 840C to provide alignment data. For example, in FIG. 14, magnet A 820 is polarized with its north pole pointing to the +Y axis. Another magnet such as magnet B 830 is oriented so that its north magnetic pole is pointed along the −X axis, and another magnet C 840 is oriented so that its magnetic north pole is oriented up from the figure, the +Z axis, coming out of the page. The electronic compass (or compasses) detects the magnet orientation in order to calculate the charging pad's orientation and their relative position. This data is provided to the user interface as alignment instructions.

In some embodiments, the magnetic pole orientation provides a coded pattern that is used to determine the orientation of the charging pad and/or represent some other information about the charging pad. Because the number of magnets can be large and the orientation of each magnet's magnetic pole may point to any point on a sphere enclosing the magnet (that is, be any combination of the vectors ±X, ±Y, ±Z axis) the number of possible encoded patterns is significant. The patterns may also be used to encode the type, manufacturer or model of the pad so that the receiving coil's charging system may calculate the best possible alignment or alter its magnetic characteristics for maximum energy transfer. This resulting alignment data is used to improve alignment instruction accuracy. The number of poles per magnet may also be used as part of the coded pattern. The number of charging pads in a given location and the number of commercial charging pad designs are likely to be relatively small and therefore unique to the parking garage or cluster of EVSEs. Therefore, the charging pad's magnetically encoded identity can be used in the charging process to replace the SLAC Association process and the validation process. In some embodiments, the magnets are located on both the energized and receiving charging pads.

In some embodiments, communication of the electronic compass data (including magnetometer data, accelerator data, gyroscopic data, time data, and resulting calculations including position data) is passed between the EVSE and EV using a wireless communications interface including power line communications protocol over the charging magnetic field, RF, optical methods, the like, or a combination thereof. By exchanging electronic compass data, both the EVSE and the EV can calculate alignment data and an optimum alignment solution identified. In order for the EVSE charging pad to be able to detect the EV charging pad, the EV charging pad has to contain a magnet or be temporarily energized. However, in some embodiments, when the EVSE and EV both have electronic compass capabilities, they can measure the relative speed and direction of each pad with respect to the other. If the direction reported by the EVSE and EV are the opposite of each other, but the speed is the same, within a tolerance, it is sufficient proof that the EVSE and EV are actually the proper pair and can be associated and validated using the SLAC process. In some embodiments, the direction, acceleration, and magnetic field data is time stamped so that it can be more precisely compared and a better determination of association and validation may be made.

In some embodiments with the ability to communicate between charging systems, the type of charging pad (e.g., the energized pad make and model) can be communicated to the other charging system (e.g., the EV) and compared to the other charging system's (e.g., the EV) charging pad's magnetic field characteristic data that is stored within its controller. The comparison is made in order to verify its identity. For example, the EVSE records the magnetic field data representing the EV's charging pad and sends it to the EV where it is compared, within the EV's controller, to stored data about the EV's charging pad. If the data matches within tolerance, the result can replace the SLAC and validation processes. In some embodiments, both charging systems can measure and exchange each other's magnetic field and accelerometer data, thereby further improving the self-identification and/or alignment processes.

In some embodiments, magnets and pole orientation angles on both charging pads are utilized. The EVSE and EV detect the magnet data such as location and pole orientation and send this information to the other. At least one of the EVSE or EV compares the information to their internally stored information about themselves. If the data matches, it is sufficient proof of the correct Association replaces the need for a SLAC or validation processes. The process of telling the other device what it sees is preferred over an embodiment that does not include communication, because the comparing system only needs to know about its own charging pad characteristics.

In some embodiments, the energized pad may be a very large area capable of simultaneously or sequentially charging multiple EVs located over its surface. These methods are also useful in locating EVs and energizing the relevant parts (coils) of the charging pad for safe and efficient transfer of energy.

In some embodiments, where power line communications are used to communicate between energized and receiving charging pads, the signal to noise ratio (SNR) or signal attenuation method, as used in SLAC, can be used to determine when the charging pads are optimally aligned. This data may also be used with combinations of the other data previously disclosed.

The usage of the SLAC protocol in the described embodiments is not meant to be limiting as the embodiments could be applied and used with other existing and future protocols.

In some embodiments, the user interface may be implemented using a text display that provides directional instructions such as forward, back, left and right. Up and Down alignment is also possible for 3-D electronic compass systems. In some embodiments, the user interface may be a graphical display that indicates textual and/or graphical instructions for aligning the charging pads. The interface may be interactive. In some embodiments, the user interface may be an audio interface, which may, for example, change the frequency of a tone, or use speech synthesis to tell the user how to align the charging pads. The audio user interface may also include the ability for the user to use voice audio instructions to the EV in response. In some embodiments, the information from the electronic compass is used by the system (e.g. a control system for the EV) to steer, drive, and brake the EV and autonomously align the charging pads. The user interface can also be a remote device such as a smart cell phone. These user interface methods can be used individually or in combinations and in the EV, EVSE or both.

While this disclosure has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:
    a first charging pad electrically connected to a first system, the first charging pad being configured to transmit an energy by an electromagnetic field;
    a second charging pad electrically connected to a second system, the second charging pad configured to receive at least a portion of the energy from the first charging pad;
    an electronic compass configured to provide alignment data of the first and second charging pads; and
    a PLC (power line communications) connection configured to communicate data between the first system and the second system, wherein the PLC connection is configured to use the electromagnetic field between the first charging pad and the second charging pad to communicate the data between the first system and the second system.

2. The system of claim 1, wherein the first system is a charging system, and wherein the second system is an electric vehicle (EV).

3. The system of claim 1, wherein the first system is an electric vehicle (EV), and wherein the second system is a charging system.

4. The system of claim 1, wherein the PLC connection is further configured to determine alignment of the first and second charging pads using a signal to noise ratio of the PLC connection.

5. The system of claim 1, wherein at least one of the first charging pad and the second charging pad further comprises a plurality of conductive coils.

6. The system of claim 1, wherein the electronic compass is comprised of a 1, 2, or 3 axes magnetometer; a 1, 2, or, 3 axes accelerometer; a 1, 2 or 3 axes gyroscope, or a combination thereof.

7. The system of claim 1, wherein the electronic compass is in the second system.

8. The system of claim 1, wherein the electronic compass is in the first system.

9. The system of claim 1, wherein the alignment data is comprised of a 1, 2, or 3 axes magnetometer data.

10. The system of claim 1, wherein the alignment data consists of magnetometer data representing a magnetic field of the first charging pad and is used to locate a proper location of the second charging pad with respect to the first charging pad for optimal energy coupling performance.

11. The system of claim 1, wherein the alignment data consists of magnetometer data representing a magnetic field of a magnet attached to one or both of the first and second charging pads and is used to locate a proper location of the other charging pad for optimal energy coupling performance.

12. The system of claim 1, wherein the alignment data consists of magnetometer data representing a magnetic field of a magnet attached to one or both of the first and second charging pads, wherein the magnet has magnetic poles aligned as indications of the respective charging pad identity.

13. A system comprising:
    a charging device comprising a first charging pad, the first charging pad configured to transmit an energy by an electromagnetic field, the charging device further comprising a first PLC (power line communications) node coupled to the first charging pad; and
    an electronic device comprising:
        a second charging pad configured to receive at least a portion of the energy from the first charging pad;
        a second PLC node coupled to the second charging pad, the first PLC node configured to communicate a PLC signal using the electromagnetic field between the first charging pad and the second charging pad; and a power converter coupled to the second charging pad, the power converter configured to convert the received energy into charging energy for the electronic device.

14. The system of claim 13, wherein the second PLC node is further configured to communicate with the power converter to manage a charging process for the electronic device.

15. The system of claim 13 wherein the first PLC node and the second PLC node are further configured to determine alignment of the first and second charging pads using a signal to noise ratio of the PLC signal.

16. The system of claim 13 further comprising:
an electronic compass configured to provide alignment data of the first and second charging pads.

17. A system comprising:
a first charging pad electrically connected to a first system, the first charging pad being configured to transmit an energy by an electromagnetic field;
a second charging pad electrically connected to a second system, the second charging pad configured to receive at least a portion of the energy from the first charging pad;
an electronic compass configured to provide alignment data of the first and second charging pads; and
an optical connection configured to communicate data between the first system and the second system.

18. The system of claim 17, wherein the first system is a charging system, and wherein the second system is an electric vehicle (EV).

19. The system of claim 17, wherein at least one of the first charging pad and the second charging pad further comprises a plurality of conductive coils.

20. The system of claim 17, wherein the electronic compass is comprised of a 1, 2, or, 3 axes magnetometer; a 1, 2, or, 3 axes accelerometer; a 1, 2 or, 3 axes gyroscope, or a combination thereof.

* * * * *